United States Patent
Kang et al.

(10) Patent No.: US 10,509,864 B2
(45) Date of Patent: Dec. 17, 2019

(54) LANGUAGE MODEL TRANSLATION AND TRAINING METHOD AND APPARATUS

(71) Applicant: Samsung Electronics Co., Ltd., Suwon-si (KR)

(72) Inventors: Tae Gyoon Kang, Seoul (KR); Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/947,915

(22) Filed: Apr. 9, 2018

(65) Prior Publication Data
US 2019/0163747 A1    May 30, 2019

(30) Foreign Application Priority Data
Nov. 30, 2017 (KR) .................. 10-2017-0163546

(51) Int. Cl.
| | | |
|---|---|---|
| *G06F 17/28* | (2006.01) | |
| *G10L 15/06* | (2013.01) | |
| *G06F 17/16* | (2006.01) | |
| *G06N 3/04* | (2006.01) | |
| *G06K 9/62* | (2006.01) | |
| *G10L 15/16* | (2006.01) | |
| *G10L 15/26* | (2006.01) | |

(52) U.S. Cl.
CPC .......... *G06F 17/2809* (2013.01); *G06F 17/16* (2013.01); *G06K 9/6256* (2013.01); *G06N 3/04* (2013.01); *G10L 15/063* (2013.01); *G10L 15/16* (2013.01); *G10L 15/26* (2013.01)

(58) Field of Classification Search
CPC ... G06F 17/2809; G06F 17/16; G06K 9/6256; G06N 3/04; G10L 15/063
USPC ............................................................ 704/2
See application file for complete search history.

(56) References Cited

U.S. PATENT DOCUMENTS

| 8,359,201 B1 | 1/2013 | Talbot et al. |
| 8,855,995 B1 | 10/2014 | Macherey et al. |
| 2016/0335254 A1 | 11/2016 | Issaev |

FOREIGN PATENT DOCUMENTS

| KR | 10-2011-0112192 A | 10/2011 |
| KR | 10-1735024 B1 | 5/2017 |
| KR | 10-1742244 B1 | 6/2017 |
| KR | 10-2017-0081350 A | 7/2017 |

OTHER PUBLICATIONS

Luong et al. Effective approaches to attention based NMT published Aug. 17, 2015 Google Scholar 11 pages.*

(Continued)

*Primary Examiner* — Quynh H Nguyen
(74) *Attorney, Agent, or Firm* — NSIP Law

(57) ABSTRACT

A language model training method and an apparatus using the language model training method are disclosed. The language model training method includes assigning a context vector to a target translation vector, obtaining feature vectors based on the target translation vector and the context vector, generating a representative vector representing the target translation vector using an attention mechanism for the feature vectors, and training a language model based on the target translation vector, the context vector, and the representative vector.

25 Claims, 8 Drawing Sheets

(56) References Cited

OTHER PUBLICATIONS

Gamon et al. Sentence-level MT evaluation without reference translations: Beyond language modeling published 2005 9 pages.*

Lee et al. Fully Character-Level Neural Machine Translation without Explicit Segmentation Founded 2013 published 2017 Google Scholar 14 pages.*

Lee, Jason et al, "Fully Character-Level Neural Machine Translation Without Explicit Segmentation," Computation and Language, Oct. 2016 (13 pages in English).

Vaswani, Ashish et al, "Attention Is All You Need," Proceedings of the Neural Information Processing Systems, Dec. 2017, (16 pages in English).

* cited by examiner

10

LANGUAGE MODEL TRANSLATION AND TRAINING METHOD AND APPARATUS

CROSS-REFERENCE TO RELATED APPLICATIONS

This application claims the benefit under 35 USC § 119(a) of Korean Patent Application No. 10-2017-0163546 filed on Nov. 30, 2017, in the Korean Intellectual Property Office, the entire disclosure of which is incorporated herein by reference for all purposes.

BACKGROUND

1. Field

The following description relates to language model translation and training methods and apparatuses.

2. Description of Related Art

A technological automation of speech recognition, for example, has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented language model training method includes assigning a context vector to a target translation vector, obtaining feature vectors based on the target translation vector and the context vector, generating a representative vector representing the target translation vector using an attention mechanism for the feature vectors, and training a language model based on the target translation vector, the context vector, and the representative vector.

The assigning of the context vector may include obtaining the target translation vector by preprocessing a target translation sentence to be translated.

The obtaining of the target translation vector may include obtaining the target translation sentence using speech recognition.

The assigning of the context vector may include assigning the context vector to the target translation vector for each word.

The obtaining of the feature vectors may include obtaining the feature vectors by performing character embedding on the target translation vector and the context vector.

The generating of the representative vector may include obtaining a correlation among characters in the target translation vector by performing positional encoding on the feature vectors, and generating the representative vector based on the obtained correlation.

The generating of the representative vector may include generating the representative vector using forward estimation or backward estimation for the feature vectors.

The forward estimation may estimate which character follows a first character included in the feature vectors, and the backward estimation may estimate which character follows a second character included in the feature vectors.

The language model may be based on a recurrent neural network (RNN) of a hierarchical structure.

The training of the language model may include updating a connection weight included in the RNN based on the target translation vector, the context vector, and the representative vector.

In another general aspect, a language model training apparatus includes a preprocessor configured to assign a context vector to a target translation vector, and a processor configured to obtain a plurality of feature vectors based on the target translation vector and the context vector, generate a representative vector representing the target translation vector using an attention mechanism for the feature vectors, and train a language model based on the target translation vector, the context vector, and the representative vector.

The preprocessor may obtain the target translation vector by preprocessing a target translation sentence to be translated.

The preprocessor may obtain the target translation sentence using speech recognition.

The preprocessor may assign the context vector to the target translation vector for each word.

The language model training apparatus may further include a memory storing instructions, which when executed by the processor, cause the processor to perform the obtaining of the feature vectors based on the target translation vector and the context vector, perform the generation of a representative vector representing the target translation vector using the attention mechanism for the feature vectors, and perform the training of the language model based on the target translation vector, the context vector, and the representative vector.

The processor may include a language model trainer configured to: obtain the feature vectors based on the target translation vector and the context vector; generate the representative vector representing the target translation vector using the attention mechanism for the feature vectors; and train the language model based on the target translation vector, the context vector, and the representative vector.

The language model trainer may obtain the feature vectors by performing character embedding on the target translation vector and the context vector.

The language model trainer may obtain a correlation among characters in the target translation vector by performing positional encoding on the feature vectors, and generate the representative vector based on the obtained correlation.

The language model trainer may generate the representative vector using forward estimation or backward estimation for the feature vectors.

The forward estimation may estimate which character follows a first character included in the feature vectors, and the backward estimation may estimate which character follows a second character included in the feature vectors.

The language model may be based on an RNN of a hierarchical structure.

The language model trainer may update a connection weight included in the RNN based on the target translation vector, the context vector, and the representative vector.

Other features and aspects will be apparent from the following detailed description, the drawings, and the claims.

Figure 1:
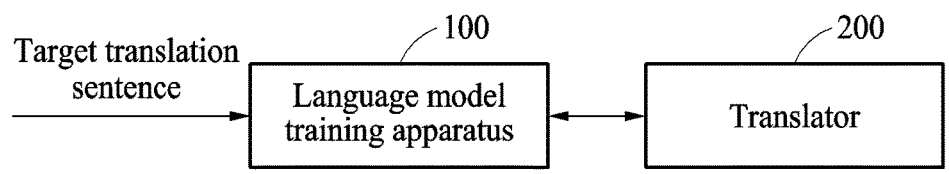
FIG. 1 is a diagram illustrating an example of a language model training system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a language model training system.

Referring to FIG. 1, a language model training system 10 may receive a sentence to be translated, or hereinafter simply referred to as a target translation sentence, and interpret and/or translate the target translation sentence. The target translation sentence used herein refers to a sentence on which translation is to be performed to generate a translated sentence. For example, the language model training system 10 may interpret and/or translate a sentence expressed in a first language into a sentence expressed in a second language. The first language and the second language, for example, Korean, Japanese, Chinese, English, German, French, and others, may be different from each other.

As illustrated in FIG. 1, the language model training system 10 includes a language model training apparatus 100 and a translator 200. Each of the language model training apparatus 100 and the translator 200 may be embodied as, for example, a personal computer (PC), a data server, and/or a portable device. Each of the language model training apparatus 100 and the translator 200, for example, includes one or more processors, such that one or more or all operations described with respect to the language model training apparatus 100 and the translator 200 may be implemented by hardware of the one or more processors specially configured to implement such operations or a combination of the hardware and/or non-transitory computer readable media storing instructions, which when executed by the one or more processors, cause the one or more processors to implement such one or more or all such operations. In an example, the same processor or combination of processors may implement both the operations described with respect to the language model training apparatus 100 and the translator 200. In an example, the language model training apparatus 100 and the translator 200 may be the same apparatus or separate apparatuses.

The portable device may be embodied as, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like.

The smart device may be embodied as, for example, a smart watch and a smart band. That is, each of the language model training apparatus 100 and the translator 200 may be a wearable device worn on a user or suitable for being worn on a user.

The language model training apparatus 100 may receive the target translation sentence to be translated. For example, the language model training apparatus 100 may receive the target translation sentence using document scanning, data transmission, typing, or speech recognition. An example of using a speech recognizer to transmit a target translation sentence to the language model training apparatus 100 will be described hereinafter with reference to FIG. 2.

The language model training apparatus 100 may generate a representative vector from the target translation sentence. The representative vector used herein refers to a vector that represents the target translation sentence.

The language model training apparatus 100 may generate a plurality of target translation vectors by preprocessing the target translation sentence. However, examples are not limited thereto, and the language model training apparatus 100 may receive the target translation vectors generated by an external device. A target translation vector used herein refers to a word-unit vector for each word included in the target sentence. For example, in a case in which the target translation sentence is "I love you," the target translation vectors may include a vector corresponding to a word "I," a vector corresponding to "love," and a vector corresponding to "you."

The language model training apparatus 100 may assign a context vector to the target translation vectors. Herein, the context vector may be a zero vector. For example, the language model training apparatus 100 may assign the context vector by a word unit, and that is, for example, assign the context vector for each word included in the target translation sentence. For example, in a case in which the target translation sentence is "I love you," the language model training apparatus 100 may assign the context vector to each of words included in the target translation sentence, for example, "I," "love," and "you."

The language model training apparatus 100 may generate a representative vector from the target translation vectors and the context vector based on a langue model. The language model may include a hierarchical structure. For example, the language model may be or include a neural network (NN), e.g., a recurrent neural network (RNN).

In an example, the neural network is a single hidden layer neural network (NN) or a deep neural network (DNN). In such examples, the NN or DNN may be one or more of a fully connected network, a recurrent neural network, or bi-directional neural network, or may include different or overlapping neural network portions respectively with such full, recurrent, and/or bi-directional connections. The neural network may be configured to perform, as non-limiting examples, speech recognition, word space mapping, or translation by respectively mutually mapping input data and output data in nonlinear relationships based on learning, e.g., based on deep learning. Such learning or deep learning is indicative of processor implemented machine learning schemes for solving issues, such as issues related to automated speech recognition, organization of such resulting recognition information for translation, and translation from a big data set, as non-limiting examples. The learning may be implemented by mapping of input data and the output data through supervised or unsupervised learning or training, such that when trained the resultant machine learning model, engine, or example NN may intuitively map further unknown input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Figure 6:
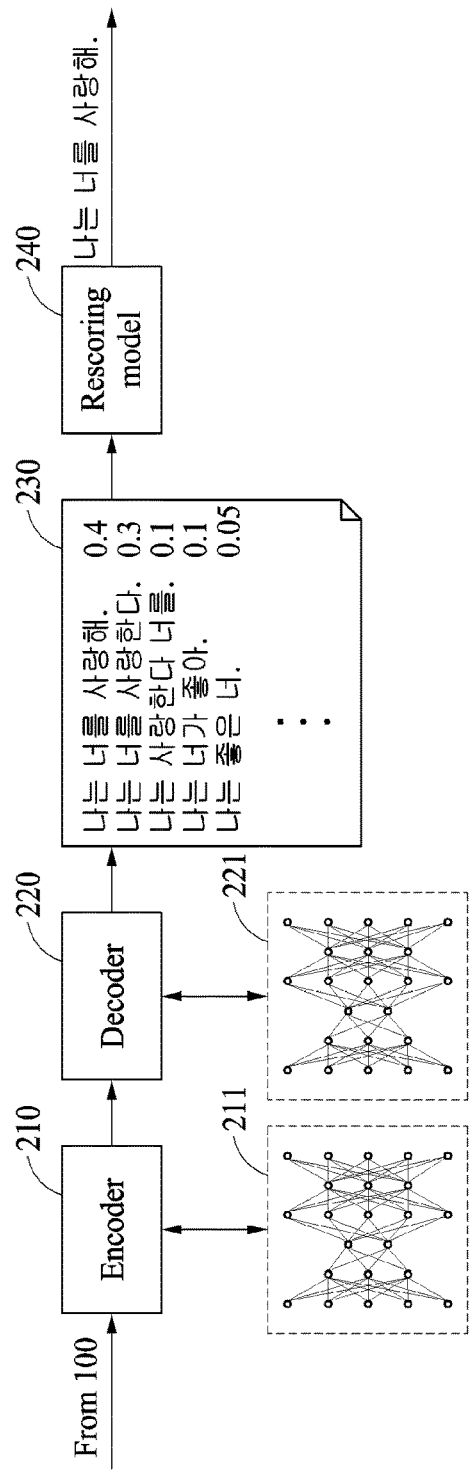
FIG. 6 is a diagram illustrating an example of operations of a translator illustrated in FIG. 1.

The example neural network includes one or more input layers, one or more hidden layers, and one or more output layers, such as illustrated in the corresponding neural networks of FIG. 6, as non-limiting examples. The input layer and the output layer may respectively include one or more nodes and the hidden layer(s) may each include a plurality of nodes. When an overall neural network includes multiple portions trained for different objectives, there may or may not be input layers or output layers between the different portions. The nodes may also be referred to as artificial neurons though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network.

The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure forward and backward connections may be provided. The links are also referred to as connections or connection weights, as referring to the hardware implemented connections or the corresponding 'connection weights' provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

The architecture, selective connections between neighboring nodes, and corresponding connection weights may be varied during training. The connection weights of the neuro network may be referred to as parameters of the neural network. For example, in a non-limiting supervised training example, the neural network may be trained based on labeled input image information or desired corresponding output recognitions or classifications and through back-propagation, as only an example. In the training, connection weightings between nodes of different hidden layers may be recursively adjusted, e.g., through back propagation, until the corresponding neural network model is trained with a desired accuracy rate or below a maximum error rate, for example. The respectively trained neuro network may be stored in a memory of any of the training, recognition, or translations apparatuses herein. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are recurrent, bi-directional, and/or fully connected hidden layers of the neural network structure. In one example, the structure may include convolutional connections. The hyper-parameters may further include information of the configuration and values of any bias and/or contextual nodes in the neural network in differing examples, corresponding activation functions of the nodes, types of nodes, such as long short-term memory nodes in some examples, and define any or any further recurrent or bi-directional structures of the neural network, which may vary in differing embodiments. Here, the example neural network information within the neural network may be information resident at, or represented by, respective layers of the neural network, and/or respective information resident at, or represented by, respective connections within the neural network. In some examples, a layer or a series of layers may output or generate one or more extracted feature information of information provided to the layer and dependent on the respective connection weights and types of connections of the layer(s). In this example, the input of each of the layers may be one, two, three, or more dimensional information, such as a multi-dimensional vector, just as the hidden layer(s) respective neural network information and the output of the neural network may also be single or multi-dimensional information dependent on the set parameters and architecture of the neural network. The output of the neural network may also be probabilistic information.

In addition, the language model training apparatus 100 may apply an attention mechanism to the language model, e.g., to or within the neural network language model. The attention mechanism may include an attention function that may map, to an output vector, a query vector Q, a pair of a key vector K corresponding to the query vector Q, and a value vector V corresponding to the query vector Q. That is, the language model training apparatus 100 may control a weight of the value vector V using the key vector K to correspond to the query vector Q. Herein, the context vector may correspond to the query vector Q, and a character included in a target translation vector in a word unit may correspond to the pair of the key vector K and the value vector V.

The context vector may be a zero vector when it is assigned to the target translation vectors, and then become a representative vector that abstracts a corresponding word while being recurrent in the language model. That is, the representative vector may be a vector that includes a meaning of a word, a correlation among characters included in a target translation vector in a word unit, and the like.

The language model training apparatus 100 may train the language model based on the target translation vectors, the context vector, and the representative vector.

The language model training apparatus 100 may transmit the generated representative vector to the translator 200.

The translator 200 may interpret and/or translate the target translation sentence based on the representative vector. For example, the translator 200 may perform training associated with the interpreting and/or the translating based on a language model including a neural network of a hierarchical structure. The performing of the training used herein may be construed as determining values of parameters or weights that configure the neural network, e.g., a desired accuracy and/or acceptable error. The language model of the language model training apparatus 100 and the language model of the translator 200 may include same or different structures.

Figure 2:
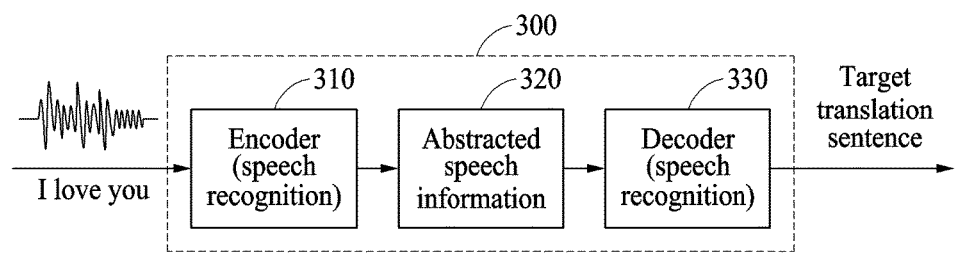
FIG. 2 is a diagram illustrating an example of how a target translation sentence is generated using a speech recognizer.

FIG. 2 is a diagram illustrating an example of how a target translation sentence is generated using a speech recognizer.

Referring to FIG. 2, a speech recognizer 300 may output a target translation sentence to be translated based on a speech signal of a user.

As illustrated, the speech recognizer 300 includes an encoder 310 and a decoder 330 for speech recognition. Each of the encoder 310 and the decoder 330 may include a neural network of a hierarchical structure. Herein, training the encoder 310 and the decoder 330 may be performed in advance. The training of the encoder 310 and the decoder 330 used herein may be construed as determining respective values of parameter or connection weights respectively thereof that thereby configure the trained neural network.

The encoder 310 may receive a speech signal of a user. The encoder 310 may output abstracted speech information 320 based on the speech signal of the user.

For example, the encoder 310 may extract a feature from the speech signal of the user. The encoder 310 may perform encoding on the extracted feature to generate a feature vector, for example, a real number vector {'2.542,' '0.827,' . . . , '5.936'}. For example, when the user speaks "I love you" to the encoder 310, the encoder 310 may extract a feature from "I love you" and perform encoding on the extracted feature to generate a feature vector. The generated feature vector may be a vector corresponding to the abstracted speech information 320.

The decoder 330 may decode the feature vector generated in the encoder 310 to generate, as a result of the speech recognition, a target translation sentence to be translated, for example, "I love you." The decoder 330 may output the target translation sentence by sub-word units or word units. A sub-word used herein may be construed as being a sequence of characters that are frequently used in a general sentence.

Each of the encoder 310 and the decoder 320, for example, includes one or more processors, such that one or more or all operations described with respect to the encoder 310 and the decoder 320 may be implemented by hardware of the one or more processors specially configured to implement such operations or a combination of the hardware and/or non-transitory computer readable media storing instructions, which when executed by the one or more processors, cause the one or more processors to implement such one or more or all such operations. In an example, the same processor or combination of processors may be configured to implement both the operations described with respect to encoder 310 and the decoder 320. Such processor or processors may also be configured to perform other operations described herein.

The speech recognizer 300 may further include a database DB. The speech recognizer 300 may store, in the DB, the speech signal of the user and results obtained from the encoder 310 and the decoder 330, for example, the abstracted speech information 320 and the target translation sentence, which is a result of the speech recognition, and the like. When the speech recognizer 300 receives the speech signal of the user, the speech recognizer 300 may output the target translation sentence based on such information stored in the DB.

Figure 3:
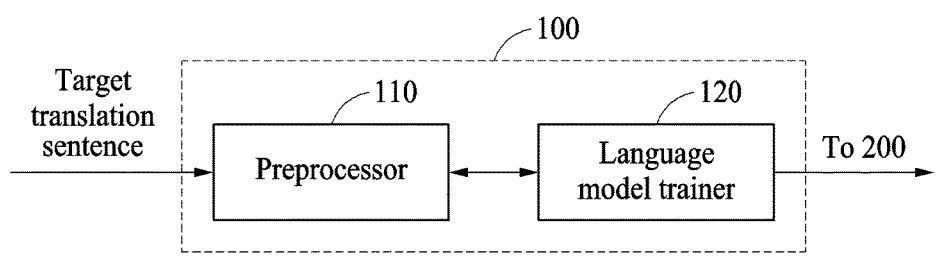
FIG. 3 is a diagram illustrating an example of a language model training apparatus illustrated in FIG. 1.

FIG. 3 is a diagram illustrating an example of the language model training apparatus 100 illustrated in FIG. 1.

Referring to FIG. 3, the language model training apparatus 100 includes a preprocessor 110 and a language model trainer 120.

The preprocessor 110 may receive a target translation sentence to be translated. For example, the preprocessor 110 may receive the target translation sentence based on speech recognition as illustrated in FIG. 2. For another example, the preprocessor 110 may receive the target translation sentence through document scanning, data transmission, typing, and the like.

The preprocessor 110 may preprocess the target translation sentence.

For example, the preprocessor 110 may generate a plurality of target translation vectors based on the target translation sentence. A target translation vector used herein refers to a word unit vector for each word included in the target translation sentence.

The preprocessor 110 may assign a context vector to each of the target translation vectors. That is, the preprocessor 110 may assign the context vector for each word in the target sentence. The context vector may be a zero vector, and become a representative vector that abstracts a corresponding word while being recurrent in a language model of the language model trainer 120.

The preprocessor 110 may output the target translation vectors and the context vector to the language model trainer 120.

The language model trainer 120 may obtain feature vectors based on the target translation vectors and the context vector. For example, the language model trainer 120 may obtain the feature vectors by performing character embedding on the target translation vectors and the context vector. The character embedding may refer to an operation of mapping a target translation vector to a vector in a certain dimension using a matrix. For example, in a case in which the character embedding is performed on target translation vectors of "I love you" and a context vector, the language model trainer 120 may obtain a plurality of feature vectors corresponding to a context vector of "I," a context vector of "love," a context vector of "you," "I," "l," "o," "v," "e," "y," "o," and "u." That is, the language model trainer 120 may perform the character embedding by a character unit.

The language model trainer 120 may perform positional encoding on the feature vectors. The positional encoding may also be referred to as positional embedding. The positional encoding may refer to encoding performed to identify a position of a word or a character. For example, in a case of a sentence, the language model trainer 120 may perform encoding to identify words at different positions in the sentence based on a position of each of the words in the sentence. For another example, in a case of a word, the language model trainer 120 may perform encoding to identify characters at different positions in the word based on a position of each of the characters in the word.

Herein, the language model trainer 120 may obtain a correlation among characters included in a target translation vector. For example, in a case in which the target translation vector corresponds to "love," the language model trainer 120 may obtain a correlation among "l," "o," "v," and "e."

The correlation may include information associated with a position of a character, a character that comes before and after, and the like.

The language model trainer 120 may generate a representative vector that represents the target translation vectors based on the feature vectors obtained through the positional encoding or embedding. For example, the language model trainer 120 may use an attention mechanism for the feature vectors obtained through the positional encoding or embedding. The attention mechanism may include an attention function that maps, to an output vector, a query vector Q and a pair of a key vector K and a value vector V corresponding to the query vector Q. That is, the language model trainer 120 may control a weight of the value vector V using the key vector K to correspond to the query vector Q. Herein, the context vector may correspond to the query vector Q, and a character included in a target translation vector in a word unit may correspond to the pair of the key vector K and the value vector V.

The language model trainer 120 may generate the representative vector using forward estimation or backward estimation for the feature vectors obtained through the positional encoding or embedding. The representative vector may refer to a vector that represents the target translation sentence to be translated.

The forward estimation may refer to a process of estimating a character that follows a first character included in the feature vectors, and the backward estimation may refer to a process of estimating a character that follows a second character included in the feature vectors. For example, the language model may be or include an RNN of a bidirectional long short-term memory (BLSTM) structure.

The language model trainer 120 may output, to the translator 200, the generated representative vector to translate the target translation sentence.

The language model trainer 120 may train the language model based on the target translation vectors, the context vector, and the representative vector. For example, the language model trainer 120 may update connection weights of the RNN of the language model.

Each of the preprocessor 110 and the language model training 120, for example, includes one or more processors, such that one or more or all operations described with respect to the preprocessor 110 and the language model training 120 may be implemented by hardware of the one or more processors specially configured to implement such operations or a combination of the hardware and/or non-transitory computer readable media storing instructions, which when executed by the one or more processors, cause the one or more processors to implement such one or more or all such operations. In an example, the same processor or combination of processors may be configured to implement both the operations described with respect to the preprocessor 110 and the language model training 120. Such processor or processors may also be configured to perform other operations described herein.

Figure 4:
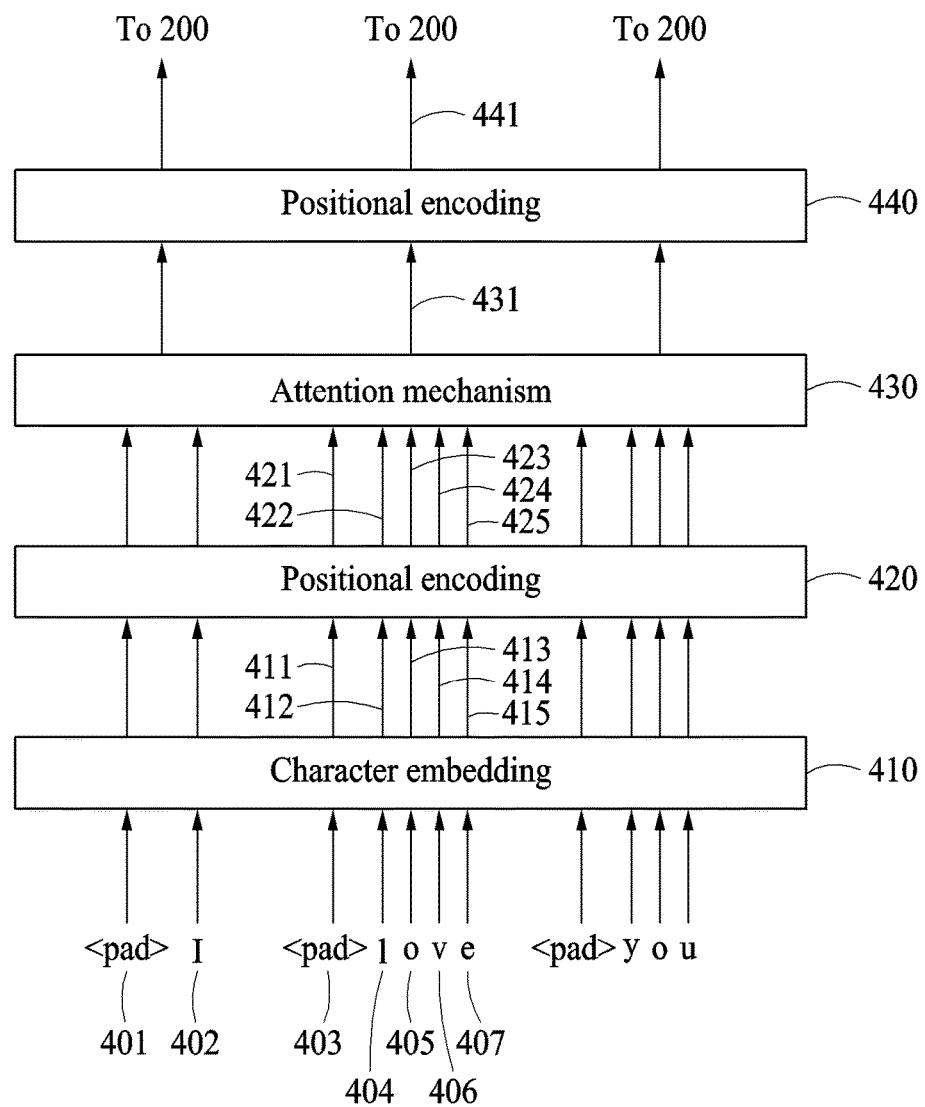
FIG. 4 is a diagram illustrating an example of operations of a language model training apparatus.
Figure 5:
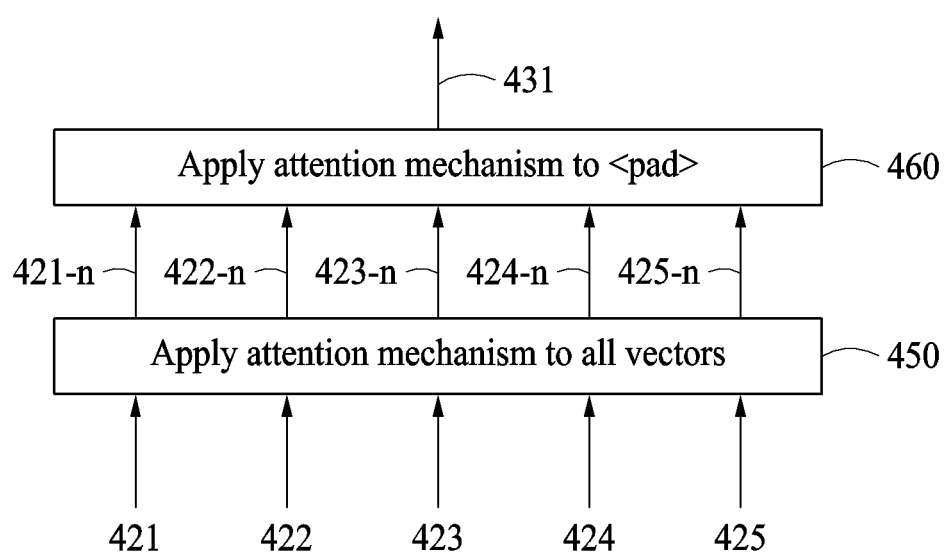
FIG. 5 is a diagram illustrating an example of an attention mechanism illustrated in FIG. 4.

FIG. 4 is a diagram illustrating an example of operations of a language model training apparatus. FIG. 5 is a diagram illustrating an example of an attention mechanism illustrated in FIG. 4.

Referring to FIGS. 4 and 5, the language model training apparatus 100 may receive a target translation sentence to be translated. The target translation sentence may be, for example, "I love you."

The language model training apparatus 100 may generate a plurality of target translation vectors from the target translation sentence by preprocessing the target translation sentence. A target translation vector refers to a word unit vector. That is, for example, the language model training apparatus 100 may generate a target translation vector respectively corresponding to "I," "love," and "you."

For example, in a case in which a target translation vector includes a plurality of characters, such as in "love" and "you," the target translation vector may include vectors, for example, a vector 404, a vector 405, a vector 406, and a vector 407 respectively corresponding to characters in "love" as illustrated.

The language model training apparatus 100 may assign context vectors 401 and 402 to the target translation vectors. That is, the context vectors 401 and 402 may be construed as being a pad to be attached to the target translation vectors for each word in the target translation sentence.

As illustrated, the language model training apparatus 100 may perform character embedding on the target translation vectors and the context vectors 410 and 403 in operation 410. The character embedding refers to an operation of mapping a target translation vector to a vector of a certain dimension using a matrix.

For example, in a case in which the character embedding is performed on the target translation vectors in "I love you" and the context vectors 401 and 403 as illustrated, the language model training apparatus 100 may obtain a plurality of feature vectors 411, 412, 413, 414, and 415 corresponding to the context vector 401 of "I," the context vector 403 of "love," a context vector of "you," "l" 402, "l" 404, "o" 405, "v" 406, "e" 407, "y," "o," and "u." That is, the language model training apparatus 100 may perform the character embedding by a character unit, or for each character.

As illustrated, the language model training apparatus 100 may perform positional encoding on the feature vectors 411, 412, 413, 414, and 415 in operation 420. The positional encoding may also be referred to as positional embedding. The language model training apparatus 100 may thus obtain a correlation among characters, for example, "l," "o," "v," and "e," that are included in "love" in the target translation sentence by performing the positional encoding. The correlation may include information associated with a position of a character and a character that comes before and after. For example, the language model training apparatus 100 may generate a feature vector 422 obtained through the positional encoding by compressing information associated with a position of "l" in "love" and a character that comes before and after "l," and semantic information of "love" into the feature vector 412 as illustrated. That is, the language model training apparatus 100 may perform the positional encoding by a character unit, or for each character.

The language model training apparatus 100 may generate a representative vector that represents the target translation vectors based on a plurality of feature vectors 421, 422, 423, 424, and 425 obtained through the positional encoding or embedding. For example, as illustrated, the language model training apparatus 100 may use an attention mechanism for the feature vectors 421, 422, 423, 424, and 425 obtained through the positional encoding or embedding in operation 430.

The attention mechanism may include an attention function that maps, to an output vector, a query vector Q and a pair of a key vector K corresponding to the query vector Q and a value vector V corresponding to the query vector Q. That is, the language model training apparatus 100 may control a weight of the value vector V using the key vector K to correspond to the query vector Q. Herein, a context vector may correspond to the query vector Q, and a character included in a target translation vector in a word unit may correspond to the pair of the key vector K and the value vector V.

As illustrated in FIG. 5, the language model training apparatus 100 may use the attention mechanism for the feature vectors 421, 422, 423, 424, and 425 in operation 450. Herein, the language model training apparatus 100 may output a plurality of feature vectors 421-$n$, 422-$n$, 423-$n$, 424-$n$, and 425-$n$ using the attention mechanism, n number of times. The feature vectors 421-$n$, 422-$n$, 423-$n$, 424-$n$, and 425-$n$ may include a context vector 421-$n$ and feature vectors 422-$n$, 423-$n$, 424-$n$, and 425-$n$ connected to the context vector 421-$n$.

For example, as illustrated in FIG. 5, the language model training apparatus 100 may generate a representative vector 431 using the attention mechanism for the context vector 421-$n$ for which the attention mechanism is used the n number of times in operation 460. The language model training apparatus 100 may generate the representative vector 431 based on the context vector 421-$n$ and an attention mechanism among the feature vectors 422-$n$, 423-$n$, 424-$n$, and 425-$n$ connected to the context vector 421-$n$.

Referring back to FIG. 4, the language model training apparatus 100 may perform positional encoding on the representative vector 431 in operation 440. The representative vector 431 used herein may be a vector representing the word "love." The representative vector 431 may include, for example, semantic information, abstract information, and position information of "love." That is, the language model training apparatus 100 may perform the positional encoding by a word unit, or for each word.

The language model training apparatus 100 may train a language model based on the target translation vectors, the context vector, and the representative vector. For example, the language model training apparatus 100 may respectively and repeatedly update connection weights of an RNN of the language model. The language model may include the RNN of a hierarchical structure.

The language model training apparatus 100 may output, to the translator 200, a representative vector 441 obtained through the positional encoding.

Although it is described that the language model training apparatus 100 performs the character embedding, the positional encoding, and the attention mechanism on the word "love" in the target translation sentence and the context vector 403, and performs the positional encoding on the representative vector 431 from the context vector 403, examples are not limited to the foregoing, and the language model training apparatus 100 may perform the same operations described in the foregoing on other words, for example, "I" and "you," in the target translation sentence.

FIG. 6 is a diagram illustrating an example of operations of the translator 200 illustrated in FIG. 1.

Referring to FIG. 6, the translator 200 includes an encoder 210 and a decoder 220. The translator 200 may correspond to the translator 200 of FIG. 1, though examples are not limited thereto.

As illustrated, the encoder 210 may generate a plurality of feature vectors by encoding a plurality of representative vectors corresponding to a target translation sentence expressed in a first language, for example, "I love you." Herein, the encoder 210 may perform the encoding using a neural network 211.

The decoder 220 may generate an m-best list 230 including m candidate sentences expressed in a second language by decoding the feature vectors. Herein, the decoder 220 may perform the decoding using a neural network 221. For example, the decoder 220 may generate the m-best list 230 using a beam search algorithm.

The m-best list 230 may include the candidate sentences corresponding to candidate initial translation results. The m-best list 230 may include, for example, " 나는 너를 사랑해 ," " 나는 너를 사랑한다 ," " 나는 사랑한다 너를 ," " 나는 너가 좋아 ," "나는 좋은 너 ," and the like corresponding to the candidate initial translation results of the target translation sentence "I love you."

In an example, an input dimension of the encoder 210 may be a dimension of a dictionary including sub-words in the first language, and an output dimension of the decoder 220 may be a dimension of a dictionary including sub-words in the second language. A sub-word used herein may be construed as being a sequence of characters that are frequently used in a general sentence. A dimension of a dictionary used herein may refer to a number of sub-words included in the dictionary.

The translator 200 further includes a rescoring model 240.

For example, the rescoring model 240 may select a final sentence based on a mean value of a probability value indicating a probability of an original sentence of each of the candidate sentences being translated into a translated sentence and of a probability value indicating a probability of the translated sentence being translated into the original sentence.

For another example, the rescoring model 240 may determine scores obtained through decoding of the candidate sentences in the second language to be scores of the candidate sentences in the second language. For example, a score of a candidate sentence may be a probability value indicating the original sentence being translated into the corresponding candidate sentence. In such an example, the rescoring model 240 may also be referred to as a ranking model.

The rescoring model 240 may output a 1-best sentence among the m candidate sentences. For example, the rescoring model 240 may output, as an initial translation result of the target translation sentence "I love you," a candidate sentence " 나는 너를 사랑해 " having a greatest score, for example, 0.4 as illustrated. A result of the rescoring model 240 may thereafter be indicated as a result of the translation.

The recording model 240 may be implemented by one or more processors configured to implement the rescoring operations. In an example, the rescoring model 240 may be a neural network or neural network portion, and thus such one or more processors may be configured to implement the rescoring neural network or neural network portion by reading and implementing the corresponding parameters from a memory and inputting neural network information of or corresponding to the m-best list 230, for example, to the recording neural network or neural network portion. In addition, each of the encoder 210 and decoder 220 includes one or more processors, such that one or more or all operations described with respect to the encoder 210 and decoder 220 may be implemented by hardware of the one or more processors specially configured to implement such operations or a combination of the hardware and/or non-transitory computer readable media storing instructions, which when executed by the one or more processors, cause the one or more processors to implement such one or more or all such operations. In an example, the same processor or combination of processors may be configured to implement both the operations described with respect the encoder 210 and decoder 220, as well as the implementing of the recording model. Such processor or processors may also be configured to perform other operations described herein.

Figure 7:
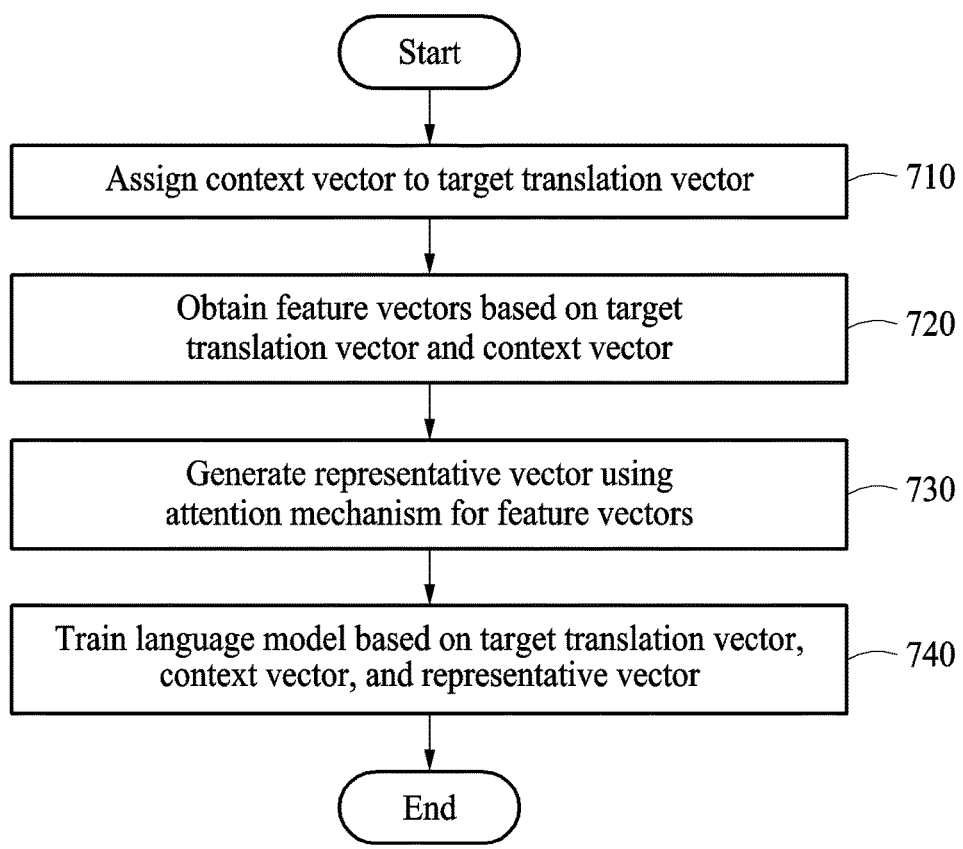
FIG. 7 is a flowchart illustrating an example of a language model training method.

FIG. 7 is a flowchart illustrating an example of a language model training method.

Referring to FIG. 7, in operation 710, the language model training apparatus 100 assigns a context vector to a target translation vector. The language model training apparatus 100 preprocesses a target translation sentence to be translated and generates a plurality of target translation vectors. A target translation vector used herein refers to a vector in a word unit. For example, in a case in which the target translation sentence is "I love you," the target translation vector may be a vector corresponding to each of "I," "love," and "you." The context vector may be a zero vector when being assigned to the target translation vector, and become a vector that abstracts the target translation vector while passing through a language model included in the language model training apparatus 100. The language model training apparatus 100 generates a representative vector based on the context vector.

In operation 720, the language mode training apparatus 100 obtains a plurality of feature vectors based on the target translation vector and the context vector. The language model training apparatus 100 performs character embedding on the target translation vector and the context vector. The language model training apparatus 100 performs positional encoding on the feature vectors obtained through the character embedding. The positional encoding may also be referred to as positional embedding. Herein, the language model training apparatus 100 performs the positional encoding by a character unit, or for each character. That is, the language model training apparatus 100 obtains a correlation among characters included in the target translation vector through the positional encoding.

In operation 730, the language model training apparatus 100 generates a representative vector using an attention mechanism for the feature vectors. The representative vector refers to a vector that represents the target translation sentence to be translated. For example, the language model training apparatus 100 may generate the representative vector through the context vector and the attention mechanism among characters connected to the context vector. The language model training apparatus 100 also performs positional encoding on the representative vector. The representative vector may include, for example, semantic information, abstract information, and position information of a corresponding target translation vector. That is, the language model training apparatus 100 performs the positional encoding by a word unit, or for each word.

In operation 740, the language model training apparatus 100 trains the language model based on the target translation vector, the context vector, and the representative vector. For example, the language model training apparatus 100 may respectively and repeatedly update connection weights of an RNN. That is, the language model includes the RNN of an aforementioned hierarchical structure.

The language model training apparatus 100 outputs, to the translator 200, the representative vector obtained through the positional encoding. Thus, the translator 200 may translate the target translation sentence, which is expressed in a first language, into a sentence expressed in a second language based on the representative vector in the first language.

Figure 8:
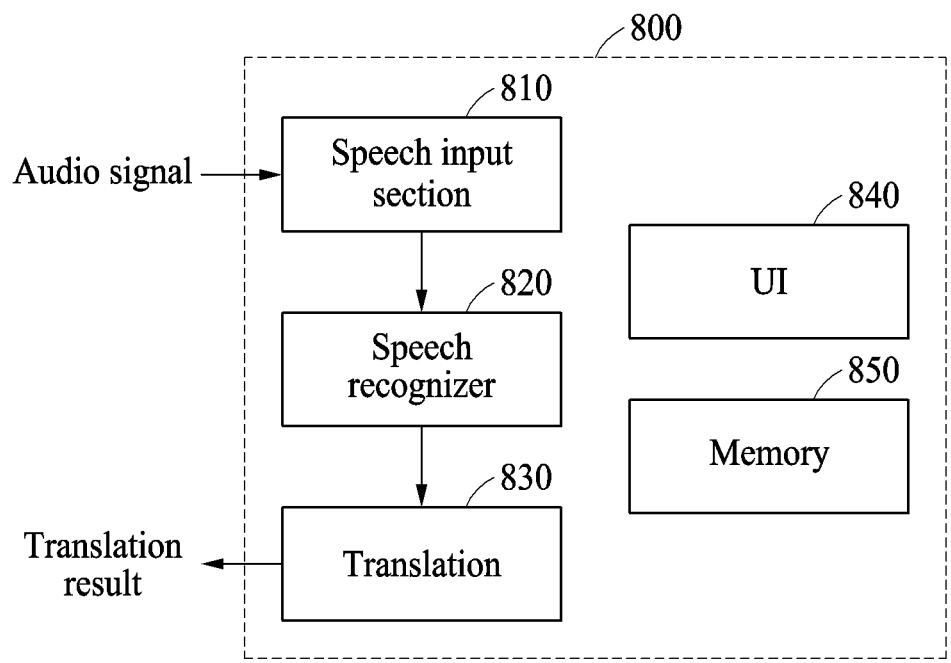
FIG. 8 is a block diagram of an example electronic device.

FIG. 8 is a block diagram of an example electronic device.

Referring to FIG. 8, the electronic device 800 may include a speech input section 810, a speech recognizer 820, and a translator 830. For example, the speech input section 810 may include a microphone, be operable in connection with or in response to such a microphone of the user interface (UI) 840, or may be part of the UI 840. The speech input section 810 may additionally or alternatively include a camera or a memory storing captured image data of text information. In one or more embodiments, the speech recognizer 820 may include the speech recognition apparatus 300 of FIG. 2, for example. The speech recognizer 820 may be understood by reference to any of the above embodiments, such that detailed description thereof will be omitted.

The speech input section 810 may receive a user's audio signal that is input through the microphone. In one or more embodiments, the user's audio signal may be related to sentences to be translated into another language or commands for controlling a TV set, driving a vehicle, intelligent speech/conversation, or the like and only as examples.

Thus, one or more acoustic and/or language models of the speech recognizer 820 may be respectively trained and used to model different languages. In an example, the speech recognizer 820 may also convert an analog audio signal input by a user into a digital signal, and may divide the signal into a plurality of speech frames. The speech recognizer 820 may output a speech recognition result in a text format, e.g., as the target translation sentence, by recognizing a user's speech by using the acoustic and language scores obtained by the respective acoustic and language models implemented by the speech recognizer 820.

The translator 830 may correspond to the translator 200 of FIG. 1, for example. The translator 830 may include the language model training apparatus 100, and/or a corresponding trained neural network resulting from the training of the corresponding language model of the language model training apparatus. In addition, the translator 830 may perform translation operations of FIG. 6 as well as the training operations of FIGS. 3, 4 and 7.

In addition, the translator 830 may indicate a result of the translation, either explicitly or implicitly. Such as by outputting the translated sentence, or by performing an operation desired by a user or an answer to a query in response to the translation result. For example, the translator 830 may output the recognition result of speech input by a user in voice through a speaker represented by the UI 840 and the like, or may provide the recognition result in a text format on a display represented by the UI 840. Further, the translator 830 may perform operations to process commands (e.g., power on/off, volume control, etc.) regarding the electronic apparatus 800. In addition, the translator 830 may execute applications installed in the electronic device 800, operate a web browser to browse a website desired by a user, provide results of a translated query. Thus, the translator 830 may translate the speech recognition result into another language, and may output a translated result in voice or in a text format, or perform or not perform further operations based on the results of the translation. However, the translator 830 is not limited thereto, and may be used in other various applications.

The electronic device 800 may be a mobile terminal and/or wearable device. Such a mobile terminal or wearable device has user input and output hardware in the UI 840, representative of a microphone, display/touch screen, physical buttons, speaker, vibration motor, camera, e.g., intercoupled via a communication bus to one or more processors of the electronic device 800 and a memory, such as memory 860. The disclosed examples and operations of FIGS. 1-7 may also be especially useful in wearable devices which generally do not have physical keyboards and only limited display area for user text/command entry, though embodiments may alternatively exist where the UI 840 includes such a physical keyboard and display(s).

Thus, as a non-exhaustive example only, the electronic device 800 as described herein may be a mobile device, such as a cellular phone, a smart phone, a wearable smart device (such as a ring, a watch, a pair of glasses, a healthcare device, a bracelet, an ankle bracelet, a belt, a necklace, an earring, a headband, a helmet, or a device embedded in clothing), a portable personal computer (PC) (such as a laptop, a notebook, a subnotebook, a netbook, or an ultramobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, other healthcare device, a mobile robot, a vehicle electronic device, user interface, or controller, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Still further, the memory 860 may be used to store one or more generated acoustic and/or language models, to be used by the speech recognizer 820, as well as the language training model of FIG. 1.

The language model training system 10, the language model training apparatus 100, the translator 200, the speech recognizer 300, the encoder 210 and 310, the abstracted speech information 320, the decoder 220 and 330, the preprocessor 110, and the language trainer 120 may increase the efficiency and/or accuracy over known methods in interpreting and/or translating a sentence expressed in a first language into a sentence expressed in a second language.

The language model training system 10, the language model training apparatus 100, the translator 200, the speech recognizer 300, the encoder 210 and 310, the abstracted speech information 320, the decoder 220 and 330, the preprocessor 110, and the language trainer 120 described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 5, 6, and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented language model training method, comprising:
   assigning a context vector to a target translation vector;
   obtaining feature vectors based on the target translation vector and the context vector;
   generating a representative vector representing the target translation vector using an attention mechanism for the feature vectors; and
   training a language model based on the target translation vector, the context vector, and the representative vector.

2. The method of claim 1, wherein the assigning of the context vector comprises:
   obtaining the target translation vector by preprocessing a target translation sentence to be translated.

3. The method of claim 2, wherein the obtaining of the target translation vector comprises:
   obtaining the target translation sentence using speech recognition.

4. The method of wherein the assigning of the context vector comprises:
assigning the context vector to the target translation vector for each word.

5. The method of claim 1, wherein the obtaining of the feature vectors, comprises:
obtaining the feature vectors by performing character embed ding, on the target translation vector and the context vector.

6. The method of aim 1, wherein the generating of the representative vector comprises:
obtaining a correlation among characters in the target translation vector by performing positional encoding on the feature vectors; and
generating the representative vector based on the obtained correlation.

7. The method of claim 1, wherein he generating of the representative vector comprises:
generating the representative vector using forward estimation or backward estimation for the feature vectors.

8. The method of claim 7, wherein the forward estimation comprises an estimation of which character follows a first character included in the feature vectors, and
the backward estimation comprises an estimation of which character follows a second character included in the feature vectors.

9. The method of claim 1, wherein the language model is based on a recurrent neural network (RNN) of a hierarchical structure.

10. The method of claim 9, wherein the training of the language model comprises:
updating a connection weight included in the RNN based on the target translation vector, the context vector, and the representative vector.

11. A language model training apparatus, comprising:
a preprocessor configured to assign a context vector to a target translation vector; and
a processor configured to:
obtain feature vectors based on the target translation vector and the context vector,
generate a representative vector representing the target translation vector using an attention mechanism for the feature vectors, and
train a language model based on the target translation vector, the context vector, and the representative vector.

12. The language model training apparatus of claim 11, wherein the preprocessor is further configured to obtain the target translation vector by preprocessing a target translation sentence to be translated.

13. The language model training apparatus of claim 12, wherein the preprocessor is further configured to obtain the target, translation sentence using speech recognition.

14. The language model training apparatus of claim 11, wherein the preprocessor is further configured to assign the context vector to the target translation vector for each word.

15. The language model training apparatus of claim 11, further comprising a memory storing instructions, which when executed by the processor, cause the processor to perform the obtaining of the feature vectors based on the target translation vector and the context vector,
perform the generation of the representative vector representing the target translation vector using the attention mechanism for the feature vectors, and
perform the training of the language model based on the target translation vector, the context vector, and the representative vector.

16. The language model training apparatus of claim 11, wherein the processor comprises:
a language model trainer configured to:
obtain the feature vectors based on the target translation vector and the context vector;
generate the representative vector representing the target translation vector using the attention mechanism for the feature vectors; and
train the language model based on the target translation vector, the context vector, and the, representative vector.

17. The language model training apparatus of claim 16, wherein the language model trainer is further configured to obtain the feature vectors by performing character embedding on the target translation vector and the context vector.

18. The language model training apparatus of claim 16, wherein the language model trainer is further configured to obtain a correlation among characters in the target translation vector by performing positional encoding on the feature vectors, and generate the representative vector based on the obtained correlation.

19. The language model training apparatus of claim 16, wherein the language model trainer is further configured to generate the representative vector using forward estimation or backward estimation for the feature vectors.

20. The language model training apparatus of claim 19, wherein the forward estimation comprises an estimation of which character follows a first character included in the feature vectors, and
the backward estimation comprises an estimation of which character follows a second character included in the feature vectors.

21. The language model training apparatus of claim 16, wherein the language model is based on a recurrent neural network (RNN) of a hierarchical structure.

22. The language model training apparatus of claim 21, wherein the language model trainer is further configured to update a connection weight included in the RNN based on the target translation vector, the context vector, and the representative vector.

23. The method of claim 1, wherein respective word-unit target translation vectors are generated for each word included in a target sentence.

24. The method of claim 1, wherein each of the feature vectors is a vector corresponding to abstracted speech information.

25. The method of claim 24, wherein the context vector is a query vector, and the attention mechanism comprises an attention function that maps the query vector to an output vector.

* * * * *